United States Patent [19]
Lee et al.

[11] Patent Number: 5,867,286
[45] Date of Patent: Feb. 2, 1999

[54] COLOR PROCESSING METHOD AND APPARATUS THEREOF USING TWO-DIMENSIONAL CHROMATICITY SEPARATION

[75] Inventors: Seong-deok Lee, Suwon; Chang-yeong Kim, Euiwang, both of Rep. of Korea

[73] Assignee: Samsung Electronics Co., Ltd., Suwon, Rep. of Korea

[21] Appl. No.: 774,653

[22] Filed: Dec. 30, 1996

[30] Foreign Application Priority Data

Dec. 30, 1995 [KR] Rep. of Korea ........................ 95-69696

[51] Int. Cl.$^6$ .............................. G03F 3/08; G06K 9/00; H04N 9/68
[52] U.S. Cl. ........................ 358/523; 348/645; 382/162; 382/167
[58] Field of Search ..................................... 348/641, 644, 348/645, 659, 661, 653, 654; 358/517, 525, 515, 518, 520, 522, 523, 524, 530, 535; 382/162, 166, 167, 168; 364/526, 927.3, 930.4

[56] References Cited

U.S. PATENT DOCUMENTS

| | | | |
|---|---|---|---|
| 4,989,080 | 1/1991 | Ito | 358/80 |
| 5,650,942 | 7/1997 | Granger | 364/526 |

OTHER PUBLICATIONS

H. Haneishi, K. Miyata, H. Yaguchi and Y. Miyake "A NEW METHOD FOR COLOR CORRECTION IN HARDCOPY FROM CRT IMAGES", *Journal of Imaging Science and Technology*, vol. 37, No. 1, pp. 30–36, Jan./Feb. 1993.

*Primary Examiner*—Scott Rogers
*Assistant Examiner*—Jerome Grant, II
*Attorney, Agent, or Firm*—Rothwell, Figg, Ernst & Kurz

[57] ABSTRACT

In a color processing method and apparatus therefor using two-dimensional (2-D) chromaticity separation for minimizing color difference between an original image and a reproduced image in a color apparatus including a color television receiver, the apparatus includes an index calculator for calculating indexes for projecting R, G and B color signals or luminance signal (Y) and color difference signals (R-Y and B-Y) in a 3-D color space onto a 2-D chromaticity plane, a first look-up table in which the indexes are stored, a second look-up table in which matrix transformation coefficients which define an input-versus-output relationship between the R, G and B color signals or luminance signal (Y) and color difference signals (R-Y and B-Y) are stored and for outputting a predetermined number of transformation coefficients stored in the corresponding address designated by the output signal of the first look-up table, and a color transformation operation unit for receiving the predetermined number of transformation coefficients output from the second look-up table, and performing a matrix operation with respect to the R, G and B color signals or luminance signal (Y) and color difference signals (R-Y and B-Y). The color processing apparatus allows real time processing owing to its simplified structure.

7 Claims, 4 Drawing Sheets

FIG.6

COLOR PROCESSING METHOD AND APPARATUS THEREOF USING TWO-DIMENSIONAL CHROMATICITY SEPARATION

BACKGROUND OF THE INVENTION

The present invention relates to a color processing method and an apparatus therefor using two-dimensional (2-D) chromaticity separation, and more particularly, to a color processing method and apparatus for minimizing differences between a desired output color and the actual output color in a color display apparatus using 2-D chromaticity separation.

In general, a color display apparatus, specifically, a color television receiver receives and demodulates a color signal produced according to a broadcasting standard (NTSC or PAL) to then be reproduced via a CRT. However, the received color signal may be distorted for various reasons. One of the main reasons for such distortion is caused by the color signal processing in a color TV receiver. In particular, a color reproducibility difference between an input color and a CRT output color is generated due to the difference between R, G, B phosphor characteristics of a CRT and those of a predetermined broadcasting standard. Also, a color deviation of intermediate colors may be generated due to non-linearity of the color TV receiver circuit. Further, an output device such as a color TV receiver must complement insufficient portions of the original colors, or partially requires a visually-sensitive color processing due to the differences in subjective personal perferences for colors.

For solving such problems, a color correction apparatus for correcting a received color signal to suit a user's own taste in colors by adjusting two reference phases in a chromaticity demodulator of a color TV receiver, which is disclosed in U.S. Pat. No. 4,695,875, has been widely used. However, such apparatuses cause whole color distortion of residual colors other than the user's desired color.

As another conventional technology pertinent to classification of a color apparatus, there are several methods of modelling a relationship between an input color and an output color on the whole color space. Among them, typical methods are a matrixing method using regression analysis and a combined method using a look-up table and volume interpolation. Of the two, the latter method is for measuring multiple color values for obtaining an input-versus-output relationship of a system to then express intermediate values using these measuring points and volume interpolation. This method can obtain relatively exact results, compared to the conventional method. Also, since local color correction for the visually-sensitive color processing is possible, this method is widely used in color printing devices, which, however, is not suitable for commercial use since hardware implementation for real-time processing is difficult to achieve because of the complicated volume interpolation in a display apparatus such as a color TV receiver, and the apparatus adopting this method becomes undesirably expensive. Also, the matrixing method using regression analysis simply converts the input-versus-output relationship into matrices, based on multiple measuring points, which is widely used in a display field. However, the matrixing method must deal with the overall color space by a single matrix. Also, local color correction as in the visually-sensitive color adjustment is not allowed.

To solve such problems, there has been a recent proposal for a method pursuing a color apparatus classification by adopting regression analysis for each section by categorizing a color into five components: flesh, gray, red (R), green (G) and blue (B). However, by dividing the color into only five typical color components, boundaries may occur between the categorized sections. Also, it is difficult to properly exhibit characteristics of various colors expressed by color combination in the color apparatus. Further, local color correction is difficult to achieve in delicate color areas by the combined colors of five primary color components. The above-described problems also occur in another conventional method to locally correct using 6-separated hue region in chromaticity, as disclosed in U.S. Pat. No. 4,989,080.

SUMMARY OF THE INVENTION

To solve the above-described problems, it is an object of the present invention to provide a color processing method and apparatus for locally correcting a color signal distortion of a color apparatus, i.e., color reproducibility differences between the phosphor characteristics of a CRT and the NTSC broadcasting standards, using 2-dimensional (2-D) chromaticity separation.

It is another object of the present invention to provide a color processing method and apparatus for correcting color signal distortion in view of visual-sensitivity, i.e., a user's own subjective color preferences, using 2-D chromaticity separation.

To accomplish the above objects, there is provided a color processing method using 2-D chromaticity separation comprising the steps of: designating a cell in a 2-D chromaticity plane separated into a plurality of small cells using three color signals indicating an arbitrary point in a three-dimensional (3-D) color space; designating an address of a memory in which a matrix transformation coefficient corresponds to each of the separated cells; reading a matrix transformation coefficient corresponding to the designated address from the memory; and performing a matrix operation with three color signals and the read matrix transformation coefficient to obtain three converted color signals.

According to another aspect of the present invention, there is provided a color processing apparatus using 2-D chromaticity separation comprising: an index calculator for calculating indices for projecting R, G and B color signals or a luminance signal (Y) and color difference signals (R-Y and B-Y) in a 3-D color space onto a 2-D chromaticity plane; a first look-up table in which the indices are stored; a second look-up table in which matrix transformation coefficients which define an input-versus-output relationship between the R, G and B color signals or luminance signal (Y) and color difference signals (R-Y and B-Y) are stored and for outputting a predetermined number of transformation coefficients stored in the corresponding address designated by the output signal of the first look-up table; and a color transformation operation unit for receiving the predetermined number of transformation coefficients output from the second look-up table, performing a matrix operation with respect to the R, G and B color signals or luminance signal (Y) and color difference signals (R-Y and B-Y).

Also, according to the present invention, there is provided a color processing apparatus using 2-D chromaticity separation comprising: an index calculator for calculating indices for projecting R, G and B color signals or luminance signal (Y) and color difference signals (R-Y and B-Y) in a 3-D color space onto a 2-D chromaticity plane; a look-up table in which matrix transformation coefficients which define an input-versus-output relationship between the R, G and B color signals or luminance signal (Y) and color difference signals (R-Y and B-Y) are stored and for outputting a predetermined number of transformation coefficients stored in the corresponding address designated by the output signal of said index calculator; and a color transformation operation unit for receiving the predetermined number of transformation coefficients output from the second look-up table, performing a matrix operation with respect to the R, G and B color signals or luminance signal (Y) and color difference signals (R-Y and B-Y).

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
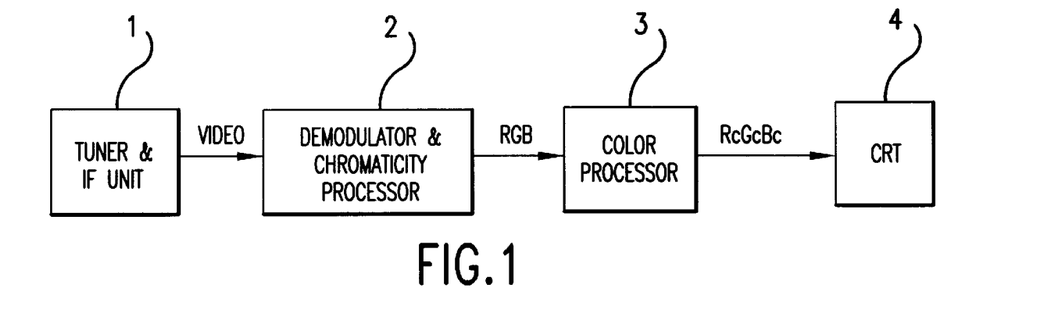
FIG. 1 is a block diagram of a color TV receiver adopting a color processor using 2-D chromaticity separation according to the present invention.

Referring to FIG. 1, a color TV receiver adopting a color processor using 2-D chromaticity separation according to the present invention includes a tuner & IF unit 1 for tuning to the carrier frequency of a modulated color signal, receiving the modulated color signal and converting the same into an intermediate frequency (IF) signal, a demodulator & chromaticity processor 2 for performing demodulation and chromaticity processing with respect to the IF signal output from the tuner & IF unit 1 to generate R, G and B signals, a color processor 3 for converting the R, G and B signals output from the demodulator & chromaticity processor 2 into a signal suitable for being displayed on a CRT, and a CRT 4.

Figure 2:
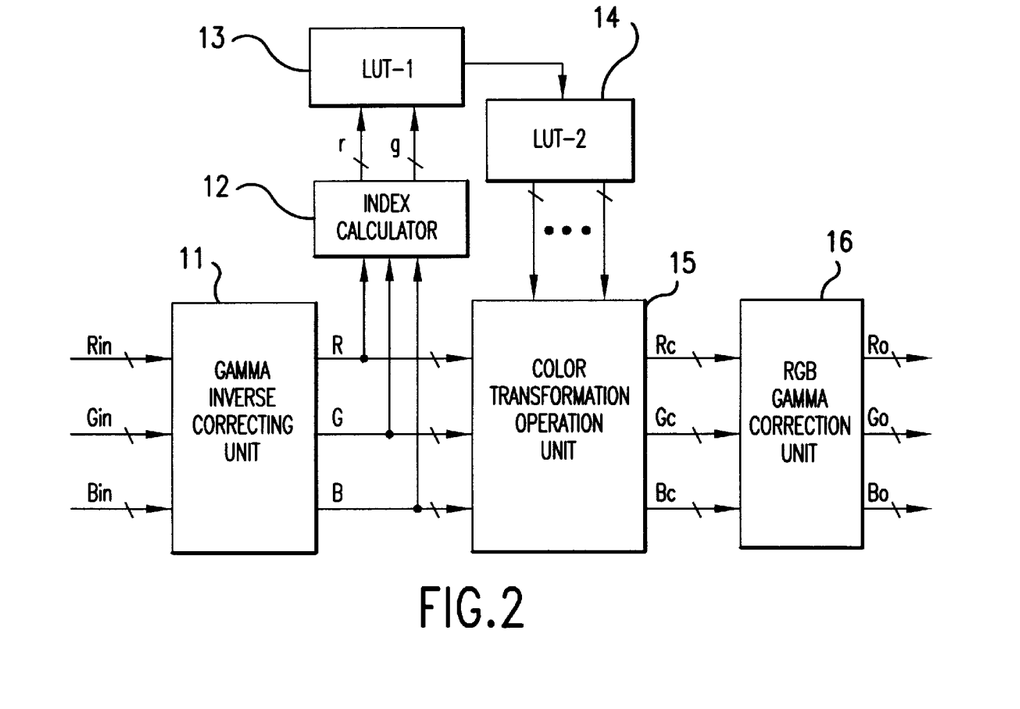
FIG. 2 is a detailed block diagram of a color processor according to the present invention.

FIG. 2 is a detailed block diagram of the color processor 3 of FIG. 1, which includes a gamma inverse correction unit 11 for inversely correcting the same gamma components as those previously corrected to R, G and B color signals or Y, R-Y and B-Y signals to eliminate the previously corrected gamma components, an index calculator 12 for calculating an index for projecting the R, G and B color signals or Y, R-Y and B-Y signals from which the previously corrected gamma components are eliminated onto a 2-D chromaticity section, a first look-up table (LUT-1) 13 in which index values are stored, a second look-up table (LUT-2) 14 in which transformation coefficients of matrices for defining input-versus-output relationship of the R, G and B signals or Y, R-Y and B-Y signals are stored, for outputting a predetermined number of transformation coefficients stored in corresponding addresses specified by an output signal of the first look-up table 13, a color transformation operation unit 15 for receiving the predetermined number of transformation coefficients output from the second look-up table 14, performing a matrix operation with respect to the R, G and B signals or Y, R-Y and B-Y signals output from the gamma inverse correction unit 11, and outputting the transformed color signals, and a RGB gamma correction unit 16 for correcting RGB gamma characteristics of circuits to display the transformed color signals output from the color signal operation unit 15.

The operation and effect of the present invention will now be described with reference to FIGS. 1 and 2.

In FIGS. 1 and 2, the R, G and B signals or luminance signal (Y) and chromaticity signals R-Y and B-Y output from the demodulator & chromaticity processor 2 are input to the gamma inverse correction unit 11.

The gamma inverse correction unit 11 inversely corrects the same gamma components of the inputted R G, B, or Y, R-Y, B-Y signals as the previously corrected. (1/2.2 in the case of NTSC standards) to eliminate the previously corrected gamma components. The R, G and B color signals or Y, R-Y and B-Y signals from which the previously corrected gamma components are eliminated are applied to the index calculator 12 and color transformation operation unit 15, respectively.

The index calculator 12 performs an operation for projecting three-dimensional (3-D) R, G and B color signals onto the 2-D chromaticity section. The r and g signals output from the index calculator 12 are index signals for indexing the positions of the corresponding cell in the 2-D chromaticity section composed of multiple small cells.

The first look-up table (LUT-1) 13 is a table in which the index values are stored. For example, when 4 bits are allocated to each of the r and g signals, the first look-up table (LUT-1) 13 has a size of 16×16 (256 virtual cells corresponding to 136 actual cells). Digits ranging from 0 up to 136 are stored in the respective cells. The second look-up table (LUT-2) 14 is a table in which are stored coefficients of transformation matrices for defining the input-versus-output relationship of the R, G and B signals. For example, when the table has a 3×3 structure, nine coefficients in total become a set, and the number of maximum available sets is 136. However, actually, there is no limit in the number of sets. The output signal of first look-up table 13 indexes the corresponding address of the second look-up table 14, and the second look-up table 14 outputs nine (3×3) transformation coefficients stored in the corresponding addresses to the color transformation operation unit 15. On the contrary, the corresponding address of the second look-up table 14 may be directly indexed by the index value calculated from the index calculator 12 without using the first look-up table 13.

The color transformation operation unit 15 receives the nine transformation coefficients output from the second look-up table 14 and performs a matrix operation with respect to the R, G and B color signals output from the gamma inverse correction unit 11. As a result, the three transformed values of the R, G and B signal values, i.e., Rc, Gc and Bc, are applied to the RGB gamma correction unit 16.

The RGB gamma correction unit 16 linearly compensates for RGB gamma characteristics of circuits related to the output of the transformed color signals, including the CRT 4 in the case of the color TV receiver.

As described above, the color-transformed and gamma-corrected color signals output from the color processor 3 are input to the CRT 4 to then be displayed.

Figure 3A:
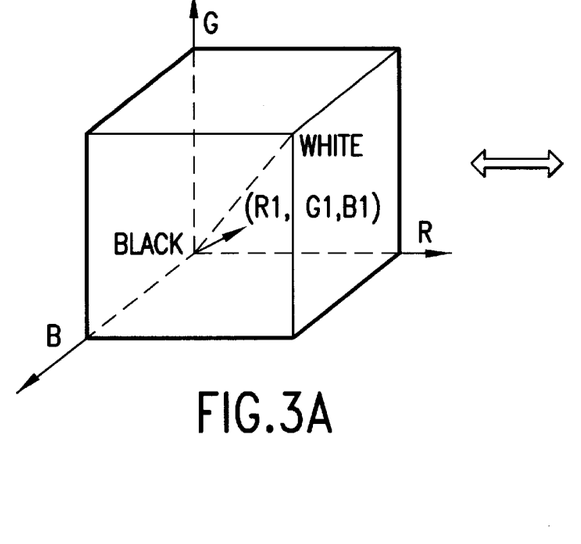
FIGS. 3A and 3B illustrate a RGB color space and a r-g color plane, respectively.
Figure 3B:
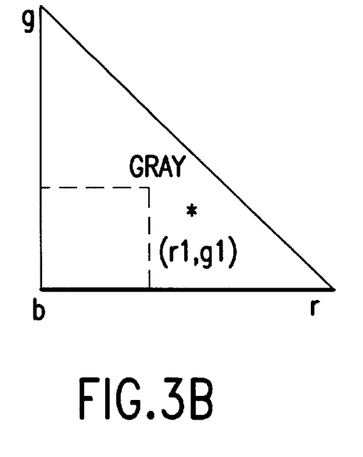

FIGS. 3A and 3B illustrate a RGB color space and a r-g color plane, respectively. An arbitrary point (R1, G1, B1) in the 3-D color space denotes a specific color, and the color at this point can be displayed by a point (r1, g1) in the 2-D chromaticity plane using a projection method using following equations (1).

$$r1 = \frac{R1}{R1+G1+B1}, g1 = \frac{G1}{R1+G1+B1}. \tag{1}$$

Therefore, all colors in the 3-D color space can be described in the 2-D chromaticity plane and can also be easily applied to color classification by hue or saturation.

Figure 4:
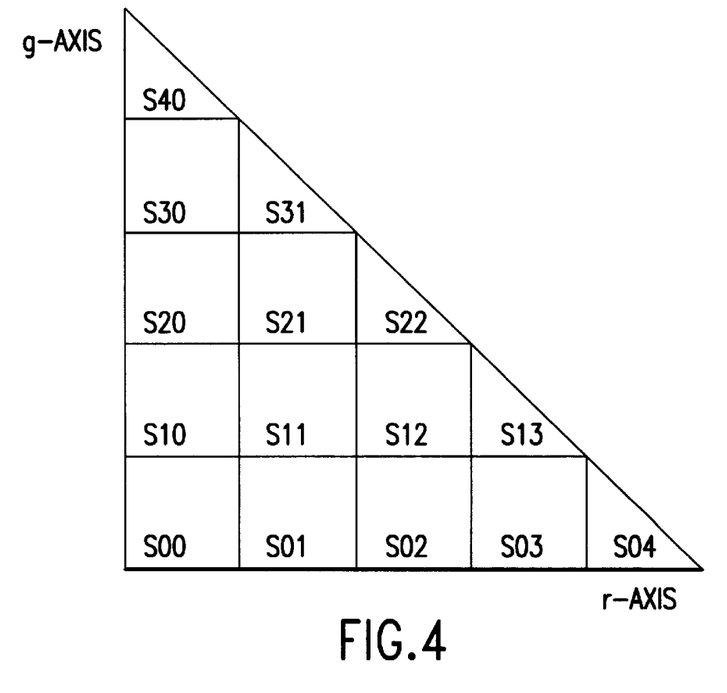
FIG. 4 is a conceptual diagram of chromaticity section separation in the r, g color plane shown in FIG. 3.

FIG. 4 illustrates a 2-D chromaticity plane separated into 15 sections, in which small separated cells S00, S01, ... S40 are different from one another in view of definition of color and saturation. Therefore, the definition of the input-versus-output relationship for each cell is more exactly expressed in a simpler equation than that for the whole color space. At this time, in the case of a display device, for example, the process of obtaining transformation coefficients for the separated small cells will be described.

In a first step, 9×9×9 (729) or 17×17×17 (4913) colors are input to addresses from 0 to 255 at 32 (or 16) cell intervals for R, G and B color signals, respectively, and the corresponding colors are measured from the CRT as color coordinate colors such as CIE_XYZ by a calorimeter to then be output as measured values.

In a second step, RGB gamma values CIE_X, CIE_Y and CIE_Z between the measured CIE_XYZ values and the input R, G and B color signals are obtained by using following equations (2):

$$CIE\_X = R'^1, CIE\_Y = G'^2, CIE\_Z = B'^3. \tag{2}$$

In a third step, all measured CIE_XYZ values are converted to RrGrBr color values by the following equation (3):

$$\begin{bmatrix} R_r \\ G_r \\ B_r \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} X \\ Y \\ Z \end{bmatrix} \tag{3}$$

At this time, the transformation matrix A is easily obtained by the chromaticity of the RGB phosphor and the definition of a point corresponding to white.

In a fourth step, cells are separated into a predetermined size (e.g., 16×16) in a 2-D section, and all converted RrGrBr values are projected onto the 2-D chromaticity plane to obtain measured values belonging to the respective cells.

In a fifth step, the input-versus-output relationship between input signals (R, G and B) and measured signals (CIE_XYZ) will be obtained for each cell as follows. First, a non-linearity between the input values and measured values is eliminated by applying three gamma values obtained in the second step with respect to the input signals R, G and B. Second, the relationship between the gamma-corrected input signals (RgGgBg) and measured values (CIE_XYZ) is regressively analyzed by the following equation (4) to obtain a transform function T.

$$X = TR \rightarrow T = (XR^T)(RR^T)^{-1} \tag{4}$$

where $$X = \begin{bmatrix} X_1 & X_2 & X_3 & \ldots & X_m \\ Y_1 & Y_2 & Y_3 & \ldots & Y_m \\ Z_1 & Z_2 & Z_3 & \ldots & Z_m \end{bmatrix},$$

$$T = [T_{3\times3}], R = \begin{bmatrix} R_1 & R_2 & R_3 & \ldots & R_m \\ G_1 & G_2 & G_3 & \ldots & G_m \\ B_1 & B_2 & B_3 & \ldots & Z_m \end{bmatrix}$$

and m denotes the total number of measured values belonging to an arbitrary cell.

In a sixth step, the input signals (RGB) are transformed into color-corrected output signal (RcGcBc) as written in the following equations (5), using the above equations (3) and (4).

$$\begin{bmatrix} X \\ Y \\ Z \end{bmatrix} = A^{-1} \begin{bmatrix} R_{input} \\ G_{input} \\ B_{input} \end{bmatrix}, \begin{bmatrix} R_c \\ G_c \\ B_c \end{bmatrix} = T^{-1} \begin{bmatrix} X \\ Y \\ Z \end{bmatrix} \tag{5}$$

$$\begin{bmatrix} R_c \\ G_c \\ B_c \end{bmatrix} = T^{-1} \begin{bmatrix} R_{input} \\ G_{input} \\ B_{input} \end{bmatrix} = M \begin{bmatrix} R_{input} \\ G_{input} \\ B_{input} \end{bmatrix}$$

In a seventh step, a cell grouping by which, among coefficients of a transformation matrix M obtained for the respective cells in the sixth step, coefficients having similar characteristics are collected to form a group, is repeatedly performed for all cells to then minimize the number of transformation matrices in the 2-D chromaticity plane.

Figure 5:
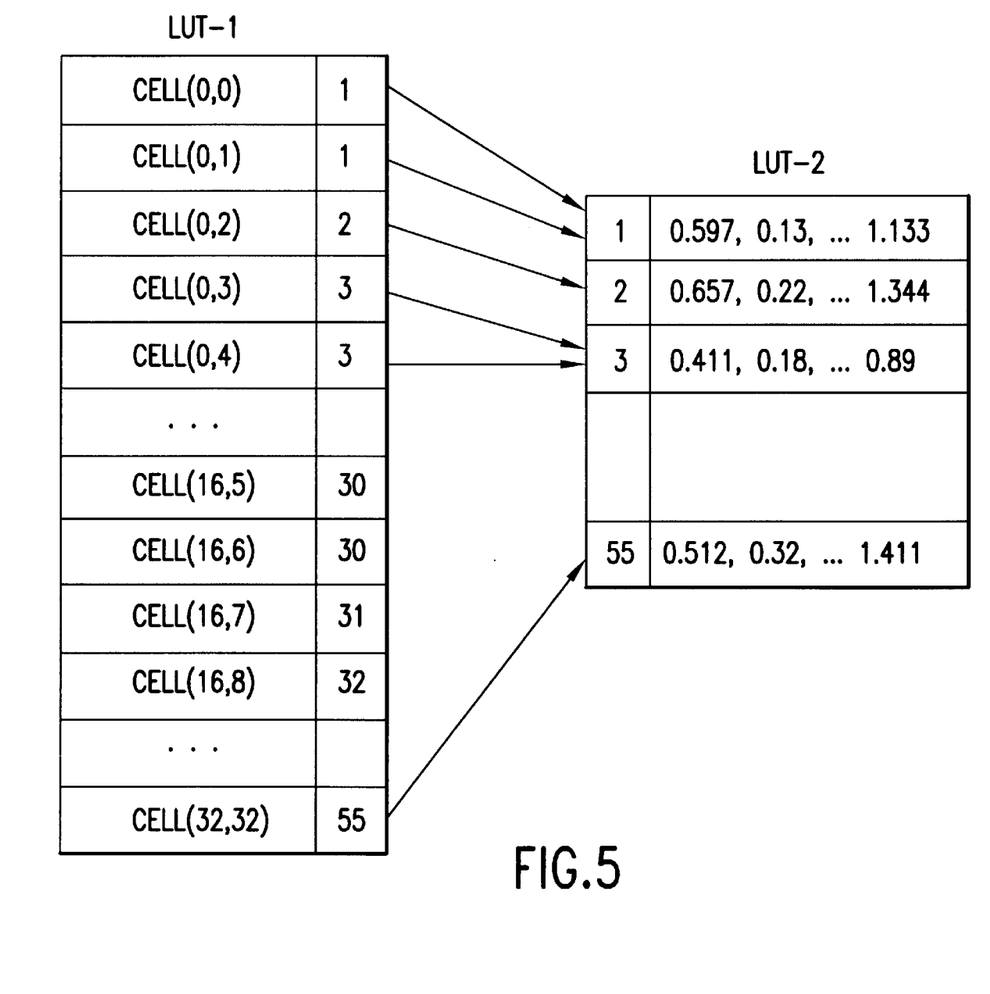
FIG. 5 shows first and second look-up tables shown in FIG. 2.

If the coefficient values for the respective cells separated in the first through seventh steps are obtained, the coefficient values are stored in the second look-up table 14, and values for indexing the positions of the coefficient values stored in the second look-up table 14 are stored in the first look-up table 13. An example of data stored in the first and second look-up tables 13 and 14 is illustrated in FIG. 5.

At this time, if the size of the separated cell is the 2-D chromaticity plane is made smaller, the input-versus-output relationship between color signals becomes more distinct and local color correction performed more exactly. However, the size of a look-up table composed of nine matrix coefficient sets becomes increasingly larger. Therefore, the number of matrices can be reduced by collecting into one the cells having similar color expressing properties, i.e., similar matrix coefficient values, while maintaining the small size of the separated cell. The irregular mapping relationship between cells and corresponding matrix coefficients is stored in the matrix coefficient index table of the first look-up table 13.

In the embodiment of the present invention, the 3-D color space was projected onto the 2-D chromaticity plane, and the chromaticity section separation was tried for various cases in the 2-D chromaticity plane, of which the result is as follows.

First, the experiment targets were various circuits ranging from a video input terminal to a CRT of a 29-inch color TV receiver. Table 1 shows an example of equivalent separation of a r-g plane section in a RGB color space. As shown in Table 1, about 55 cells are appropriately separated into sections, in view of chromaticity. Among 55 cells, 39 were matrix coefficients actually used through the cell grouping.

TABLE 1

| Separation number/axis | 1 | 5 | 8 | 10 | 16 |
|---|---|---|---|---|---|
| Allocated bit(s) | 1 bit | 3 bits | 3 bits | 4 bits | 4 bits |

TABLE 1-continued

| | | | | | |
|---|---|---|---|---|---|
| Resolution (0~1) | 1 | 0.2 | 0.125 | 0.1 | 0.0625 |
| Virtual cells | 1 | 25 | 64 | 100 | 256 |
| Actual cells | 1 | 15 | 36 | 55 | 136 |
| Mean chromaticity | 6.6 | 4.1 | 3.6 | 3.35 | 3.3 |

Figure 6:
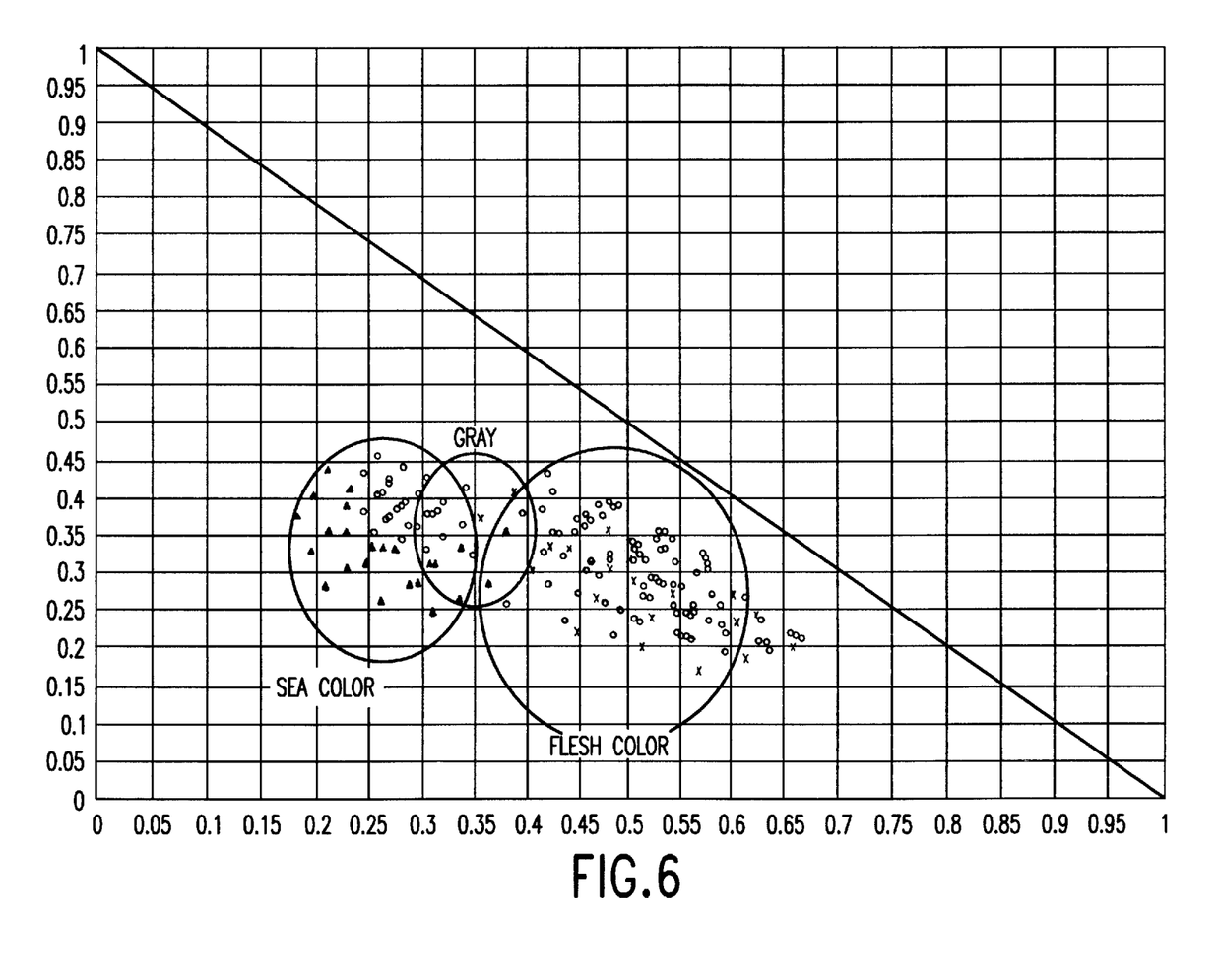
FIG. 6 is a graph showing 2-D chromaticity section separation and distribution of colors of interest.

FIG. 6 is a graph showing 2-D chromaticity section separation and distribution of specific colors of interest, i.e., flesh color, sea color and gray, where it is desirable to increase the number of separations for discriminating the colors of interest by delicate color correction.

As described above, according to the present invention, the color processing method and apparatus using 2-D chromaticity separation allows the same color processing accuracy as the combined method of the conventional look-up table and volume interpolation method. Also, the colors of interest alone can be locally corrected and color-processed without affecting the other colors in the overall color space.

Further, since an apparatus additionally necessary for implementing the present invention is not complex and calculation time is short due to usage of a simple matrix operation in a pixel processing time, the present invention can be adopted for a real-time image processor.

Also, the present invention can be widely applied to all digital signal processing display devices for a color tv receiver or other input/output devices such as a camera or a printer.

What is claimed is:

1. A color processing method using two-dimensional (2-D) chromaticity separation comprising the steps of:

converting an arbitrary point in a three-dimensional (3-D) color space indicated by three color signals into a designation of a particular cell in a 2-D chromaticity plane separated into a plurality of cells;

providing a memory which stores at least one matrix transformation coefficient corresponding to each of said plurality of cells at respective addresses thereof, wherein each of said plurality of cells corresponds to a particular address in said memory;

determining an address of a memory corresponding to said designated particular cell;

reading a matrix transformation coefficient stored in said determined address from said memory; and performing a matrix operation on said three color signals using said read matrix transformation coefficient to obtain three converted color signals.

2. A color processing method using 2-D chromaticity separation as claimed in claim 1, further comprising the step of:

obtaining a transformation coefficient for each of said separated cells to then store the same in said memory.

3. A color processing method using 2-D chromaticity separation as claimed in claim 2, wherein said transformation coefficient obtaining step comprises the steps of:

inputting a predetermined number of colors to addresses from 0 to 255 in predetermined section intervals for the respective R, G and B color signals and measuring the corresponding colors as predetermined color coordinate values to then output the same as measured values;

converting said measured color coordinate values to Rr, Gr and Br color values using a predetermined transformation matrix;

separating a section in a predetermined size in a 2-D chromaticity plane, projecting said converted Rr, Gr and Br color values onto said 2-D chromaticity plane to then obtain measured values belonging to each separated cell, and obtaining an input-versus-output relationship between said R, G and B color signals and said measured color coordinate values in each separated cell;

obtaining a transformation matrix for each cell for converting said R, G and B color signals into a color-corrected Rc, Gc and Bc signals from said input-versus-output relationship; and repeatedly performing a cell grouping by which, among said transformation matrix coefficients for the respective cells, coefficients having similar characteristics are collected to form a group, with respect to all cells, to minimize the number of transformation matrices in said 2-D chromaticity plane.

4. A color processing apparatus using two-dimensional (2-D) chromaticity separation comprising:

an index calculator for calculating indices for projecting R, G and B color signals or luminance signal (Y) and color difference signals (R-Y and B-Y) in a 3-D color space onto a 2-D chromaticity plane;

a first look-up table in which said indices are stored;

a second look-up table in which matrix transformation coefficients which define an input-versus-output relationship between said R, G and B color signals or luminance signal (Y) and color difference signals (R-Y and B-Y) are stored and for outputting a predetermined number of transformation coefficients stored in the corresponding address designated by the output signal of said first look-up table; and a color transformation operation unit for receiving said predetermined number of transformation coefficients output from said second look-up table, performing a matrix operation with respect to said R, G and B color signals or luminance signal (Y) and color difference signals (R-Y and B-Y).

5. A color processing apparatus using two-dimensional (2-D) chromaticity separation as claimed in claim 4, further comprising:

a gamma inverse correction unit for inversely correcting gamma components of said R, G and B color signals or luminance signal (Y) and color difference signals (R-Y and B-Y) to linearize the same, and applying the linearized signals to said index calculator (and color transformation operation unit, respectively); and an RGB gamma correction unit for linearly compensating RGB gamma characteristics of related circuits to display transformed color signals output from said color transformation operation unit.

6. A color processing apparatus using two-dimensional (2-D) chromaticity separation as claimed in claim 5, further comprising:

a gamma inverse correction unit for inversely correcting gamma components of said R, G and B color signals or luminance signal (Y) and color difference signals (R-Y and B-Y) to linearize the same, and applying the linearized signals to said index calculator (and color transformation operation unit, respectively); and an RGB gamma correction unit for linearly compensating for RGB gamma characteristics of related circuits to display transformed color signals output from said color transformation operation unit.

7. A color processing apparatus using two-dimensional (2-D) chromaticity separation comprising:

an index calculator for calculating indices for projecting R, G and B color signals or luminance signal (Y) and color difference signals (R-Y and B-Y) in a 3-D color space onto a 2-D chromaticity plane;

a look-up table in which matrix transformation coefficients which define an input-versus-output relationship between said R, G and B color signals or luminance signal (Y) and color difference signals (R-Y and B-Y) are stored and for outputting a predetermined number of transformation coefficients stored in the corresponding address designated by the output signal of said index calculator; and a color transformation operation unit for receiving said predetermined number of transformation coefficients output from said second look-up table, performing a matrix operation with respect to said R, G and B color signals or luminance signal (Y) and color difference signals (R-Y and B-Y).

* * * * *

UNITED STATES PATENT AND TRADEMARK OFFICE
CERTIFICATE OF CORRECTION

PATENT NO. : 5,867,286
DATED : February 2, 1999
INVENTOR(S) : Seong-deok Lee; Chang-yeong Kim It is certified that error appears in the above-indentified patent and that said Letters Patent is hereby corrected as shown below:

Column 4, line 12, "the" should be -- were --.

Signed and Sealed this

Sixteenth Day of November, 1999

Attest:

Q. TODD DICKINSON

*Attesting Officer*  Acting Commissioner of Patents and Trademarks